United States Patent

Tisdale

[15] 3,636,513

[45] Jan. 18, 1972

[54] PREPROCESSING METHOD AND APPARATUS FOR PATTERN RECOGNITION

[72] Inventor: Glenn E. Tisdale, Towson, Md.

[73] Assignee: Westinghouse Electric Corporation, Pittsburgh, Pa.

[22] Filed: Oct. 17, 1969

[21] Appl. No.: 867,250

[52] U.S. Cl. .......... 340/146.3AC
[51] Int. Cl. .......... G06r 9/00
[58] Field of Search .......... 340/146.3

[56] References Cited

UNITED STATES PATENTS 2,968,789 1/1961 Weiss et al. .......... 340/146.3
3,196,398 7/1965 Baskin .......... 340/146.3
3,440,617 4/1969 Lesti .......... 340/146.3

*Primary Examiner*—Thomas A. Robinson
*Attorney*—F. H. Henson, E. P. Klipfel and J. L. Wiegreffe

[57] ABSTRACT

Features are extracted from a two-dimensional image for subsequent classification of patterns within the image according to correspondence between the extracted features and reference features in a set extracted previously from known patterns. In extracting the features, measurements are first taken of observed characteristics of the image about two or more predefined points in the image, these measurements being chosen to be invariant regardless of orientation, scale, and position of the pattern in the image. The measurements, along with data regarding relative positions of the selected points, constitute the features from which eventual pattern recognition may be achieved.

20 Claims, 6 Drawing Figures

PREPROCESSING METHOD AND APPARATUS FOR PATTERN RECOGNITION

BACKGROUND OF THE INVENTION

Field of the Invention

This invention is in the field of pattern recognition which may be generally defined, in terms of machine learning, as the capacity to automatically extract sufficient information from an image to determine whether patterns contained in the image correspond to a single class or one among several classes of patterns previously taught to the machine.

The technical terms used throughout this disclosure are intended to convey their respective art-recognized meanings, to the extent that each such term constitutes a term of art. For the sake of clarity, however, each technical term will be defined as it arises. In those instances where a term is not specifically defined, it is intended that the common and ordinary meaning of that term be ascribed to it.

By "image," as used above and as will hereinafter be used throughout the specification and claims, is meant a field of view, i.e., phenomena observed or detected by one or more sensors of suitable type. For example, an image may be a two-dimensional representation or display as derived from photosensitive devices responsive to radiant energy in the visible spectrum (e.g., optical scanners responsive to reflected light, or photographic devices such as cameras) or responsive to radiant energy in the infrared (IR) region, or as presented on a cathode-ray tube (CRT) screen responsive to electrical signals (e.g., a radar plot of return signal), and so forth.

An image may or may not contain one or more "patterns." A pattern may correspond to one or more figures, objects, or characters within the image.

As a general proposition, it is the function of pattern recognition devices or machines to automatically assign specific classifications to observed phenomena. An extensive treatment of the prior art in pattern recognition is presented by Nagy in "State of the Art in Pattern Recognition" *Proc. of the IEEE*, Vol. 56, No. 5, May 1968, pp. 836–862, which contains an excellent bibliography of the pertinent literature as well.

The present invention is concerned primarily with recognition of specific patterns in two dimensional representations, including pictorial images involving spatial arrays of picture elements having a range of intensity values, e.g., aerial photographs, television rasters, printed text, et cetera, and further including signal waveforms and plots, but is not limited to only those two-dimensional representations. In the automatic assignment of specific classifications to observed phenomena by virtually any pattern recognition device, two distinct steps are followed. The first of these steps is the derivation from the observed phenomena of a set of specific measurements or features which make possible the separation of the various pattern classes of interest. A "feature" is simply one or more measurable parameters of an observed characteristic within a pattern, and is consequently synonymous with "measurement" in the sense that each may comprise a group of tangible values representing characteristics detected or observed by the sensors. The second step is the performance of classification by comparing the measurements or features obtained from the observations with a reference set of features for each of the classes.

It is the first of these steps to which this invention is specifically directed; namely, a method of preprocessing of the observed phenomena by which to extract certain features to permit an orderly and efficient recognition of the pattern or the class of patterns which are observed.

In attempts to recognize specific patterns or targets in pictorial representations, it is frequently important to provide automatic location and classification regardless of such factors as position of a pattern within the overall representation or image, orientation of the pattern relative to the edges of or overall orientation of the image, the particular scale (including magnification and reduction) relative to the image, and in some instances, the presence of obscuring or obliterating factors (including noise on a signal waveform). Methods heretofore proposed to accomplish recognition in the presence of combinations of these factors have not proven entirely successful, or at least have required such complex procedures and equipment as to virtually defeat the desired objective of automatic recognition, viz, the efficient extraction of features and the orderly solution of the recognition problem.

It is the principal object of this invention to provide a pattern recognition preprocessing method capable of deriving information necessary to permit classification, and to do so independently of position, orientation, scale and/or partial obscuration of the patterns or targets of interest.

SUMMARY OF THE INVENTION

In practicing the preprocessing method according to this invention, a determination is first made of specific points within the image or pictorial representation which relate to specific image characteristics. Such points, hereinafter referred to as "image points," may be present anywhere within the image. Each image presents a mass of data with a myriad of points which theoretically are all available, or could be considered, as image points for processing purposes. In a practical system, however, the number of image points to be processed must be substantially reduced, typically by several orders of magnitude, from those available. Thus, selection criteria are established to enable determination of the points in the image which will be accepted as image points for processing. These criteria thus are directed to accepting as image points those which provide a maximum amount of information regarding a characteristic or characteristics of the image with a minimum amount of data selected from the mass of data present within the image. This is equivalent to saying that the image points to be accepted from the image for processing are unique or singular within the image under observation and that they convey some substantial amount of information. Such points may also be considered as occurring infrequently and thus, when they do occur, convey substantial information. The choice of image points, then, is guided by a desire to effect a significant reduction from the mass of information available in selecting that information to be processed, without sacrificing the capability to detect or to recognize a pattern or patterns within the image with a substantial degree of accuracy. The selection of image points is arbitrary to the extent that the choice is not limited to any one characteristic of the observed phenomena, but is preferably guided by considerations of economy of processing and optimum discrimination between features. For example, points located at the ends of lines or edges of a figure, object, character, or any other pattern which may occur in a given image, or located at intersections of lines, would constitute a judicious selection of image points. Extreme color gradations and gray scale intensity gradients theoretically can also provide image points conveying substantial amounts of usable information, but in practice such characteristics of an image may not be sufficiently meaningful in certain images, such as photographs, because of variations in illumination and in color with time of day.

Having determined these image points, the number of which will depend at least in part upon the complexity of the image under consideration, the points are taken in combinations of two or more, the geometry relating the points is established, and the observed characteristics are related to this geometry. The observed characteristics, together with the geometrical relationship between the image points, constitute the features to be extracted from the image, and it is essential to the method of the invention that the characteristics be selected so as to be invariant relative to the scale, orientation, and position of any patterns with which they are associated. A line emanating from an image point in a specific pattern, for example, has an orientation that is invariant with respect to an imaginary line joining that image point with a second image point in the same pattern regardless of the position, orientation, or scale of the pattern in the image. On the other hand, the orientation and scale of the imaginary line joining two such image points is directly related to the orientation and scale of the pattern to which it belongs. Furthermore, the lines connecting other pairs of image points in the same pattern will have a fixed orientation and scale with respect to the first line, regardless of the orientation and scale of the pattern in the image. Advantage is taken of these factors in comparing sets of observed image features with sets of reference features for particular classes which are stored in the machine. It is important to note that the present invention does not depend upon the existence and/or the advance knowledge of a specific pattern in the image under consideration; nor is it necessary that a pattern be selected for analysis. Rather, the preprocessing method of the invention is concerned only with the selection of features within the image, in a manner to be described, for subsequent determination of whether those features define a known pattern.

After making observations on an image so as to derive features, one can separate pattern classes of interest from those classes of patterns having no relation to the derived set of features. In the classification process, the observed features are compared with a reference set of features for each of the classes of interest. The reference features are selected a priori, as by training a classifying device by storing therein samples from known pattern classes. The comparison is initiated with respect to the invariant portions of the features. In any particular comparison indicates a substantial match between a derived feature and a reference feature, i.e., a correspondence within predetermined tolerances, the orientation and scale of the derived features are normalized relative to corresponding characteristic values of the reference features. The information so obtained is utilized along with corresponding information obtained from comparisons between other derived features and reference features to obtain an output cluster of points by which recognition of the pattern is accomplished. If for any reason certain of the derived features are deleted, the number of points appearing in the output cluster is reduced, but the location of the cluster in orientation and scale may not be appreciably affected. The latter factor permits recognition of a pattern, should that pattern exist in the image under observation, despite partial obscuration of the pattern. An "output cluster," or simply a "cluster," is obtained as a grouping of points relating the matched features of the image and reference in orientation and scale. The weight assigned to the cluster is representative of the number of matched features between sample and reference for a given relative orientation and relative scale. A visual representation of the clustering may be obtained from the system output by any suitable display, such as by printing means or by an oscilloscope display.

DESCRIPTION OF THE PREFERRED EMBODIMENT

Figure 1:
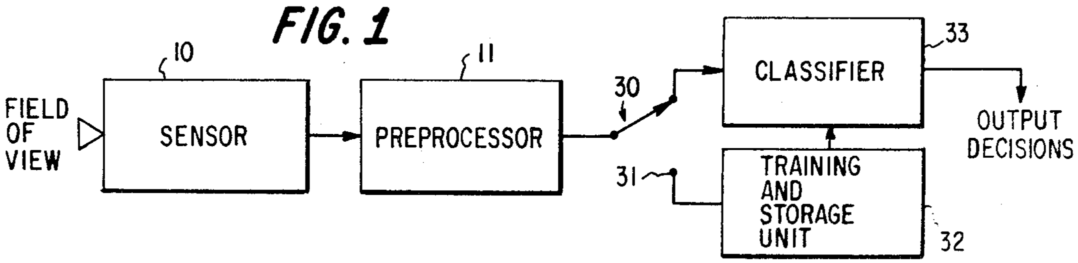
FIG. 1 is a simplified block diagram of a pattern recognition system suitable for implementing the overall recognition process.

Referring to FIG. 1, a simplified exemplary system by which pattern recognition may be achieved includes a sensor or plurality of sensors 10 responsive to detectable (observable) phenomena within a field of view which may contain one or more static or dynamic patterns to be recognized. The field of view, for example, may comprise a pictorial representation in two-dimensional form, such as the photographic image 12 represented in FIG. 2, and the sensor 10 may include a conventional flying spot scanner by which the image is selectively illuminated with a light beam conforming to a prescribed raster. Sensor 10 may also include a photodetector or photoelectric transducer responsive to light of varying intensity reflected from image 12, as a consequence of the varying details of the photograph, to generate an electrical signal whose amplitude follows the variations in light intensity. It should be observed, however, that sensor 10 may also derive image 12 by direct examination of the three-dimensional scene which it represents.

The electrical signal, of analog character, may be converted to a digital format by application of conventional analog-to-digital conversion techniques which code the output in accordance with preselected analog input ranges. In any event, the output of sensor 10 is to be supplied to a preprocessor 11 which is in essence a data compression network for extracting (i.e., determining or selecting) features from the observed phenomena, here the scanned image 12, provided that features exist within the image, and if so, for analyzing various values which comprise the features. This invention resides in the method of determining and analyzing features, so as to render the pattern recognition process independent of the position, orientation, scale, or partial obscuration of the pattern under observation.

Figures 2, 3, 4:
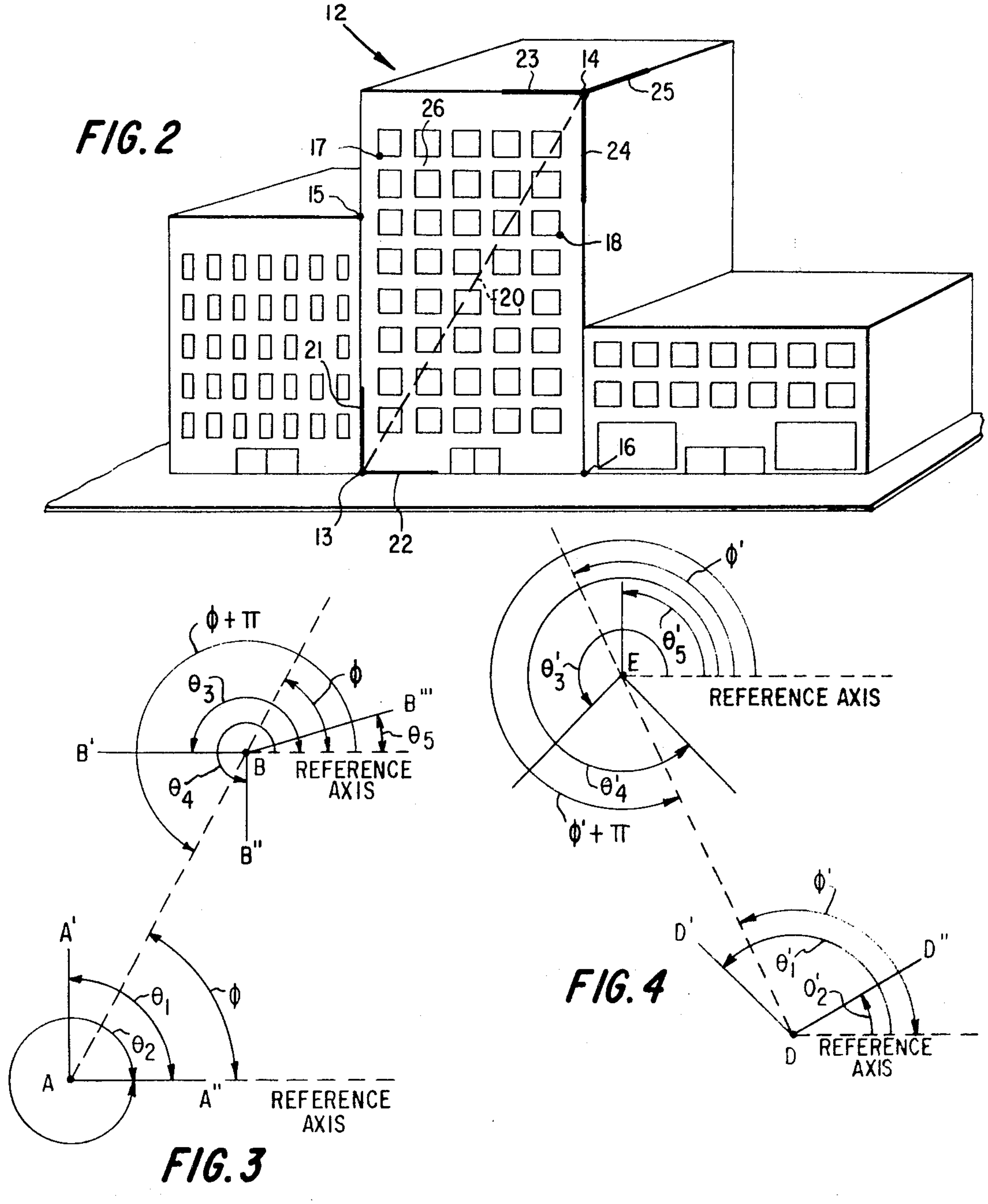
FIG. 2 is a representation of an image containing a pattern to be identified.
FIG. 3 is a schematic line diagram of a feature extracted from the pattern under test in the image representation of FIG. 2.
FIG. 4 is a schematic line diagram of a reference feature in a set of reference features against which the extracted feature is to be compared.

In particular, and with reference again to FIG. 2, a set of image points is selected on the basis of characteristics observed in the image by the sensor. In the interests of economy of processing and of optimum discrimination between features, it is preferred that the image points be predefined as those points in an image which lie along or on well-defined characteristics of the pattern. For example, points located on lines, corners, ends of lines, or at intersections of pattern figures, objects, or characters are preferably because such points convey a substantial amount of information regarding the image. Points within areas of specified color or along intensity gradients of color or gray scale of the pattern are similarly of great significance. In FIG. 2, image points 13, 14, occurring at the intersection of two or more lines in the two-dimensional field of view, e.g., a photograph, are discussed herein as representative of those utilized in the determination of features. However, any image points, such as 15, 16, 17, 18 located at line intersections, and thus satisfying the image point selection criterion established in this example for the purpose of describing the invention of the figure, might be employed.

The crux of this invention is the manner of taking measurements with respect to more than one image point, in addition to the aspect of defining those points. The features of a pattern, which are subsequently to be compared with reference features in the classification portion of the process, are extracted from the observations on the image in the form of measurements relative to the image points and to the geometry of interconnection of those image points. Suppose, for example, that image points are chosen at the intersection of two or more lines observed in the figure. Then a feature might be formed from image points 13 and 14 in FIG. 2, with lines 21 and 22 emanating from image point 13, and lines 23, 24, and 25 emanating from image point 14. The feature would consist of the directions of lines 21, 22, 23, 24, and 25 relative to an imaginary line, designated by reference numeral 20, connecting image points 13 and 14, which directions are invariant relative to the scale, orientation, or position of the two-dimensional representation of building 26 in the image, and the orientation and length of the imaginary line 20 between image points 13 and 14.

The image points, imaginary interconnecting line and emanating lines are removed from the pattern of FIG. 2 and shown isolated in FIG. 3, for the sake of clarity in the explanation of measurements relative to the image points. A reference axis or reference direction for measurements has also been selected (corresponding to edge 22 in FIG. 2). The image points A and B, corresponding to points 13 and 14 in FIG. 2, may be defined by coordinates $X_A X_A$ and $X_B$, $Y_B$, respectively, in a Cartesian coordinate system. The length of line $\overline{AB}$, is simply the square root of the sum of the squares of the perpendicular distances between them in the rectangular coordinate system, or $$\overline{AB}(\text{length})=[(X_B-X_A)^2+(Y_B-Y_A)^2]^{1/2}$$

The length of line $\overline{AB}$ is of course, dependent of the particular scale of the image from which the observations are made. However, the length of line $\overline{AB}$ relative to the length of any line or lines connecting other image points is independent of the image scale. This is an important aspect both here and in the classification process to be described presently.

The orientation of line $\overline{AB}$ with respect to the arbitrarily selected reference direction (FIG. 3) at point A is defined by the angle $\phi$therebetween. Similarly, the orientations of lines AA' and AA'' relative to the reference direction are defined by angles $\theta_1$ and $\theta_2$, respectively, each of these angles measured in the positive direction. The direction of line AA' relative to line $\overline{AB}$ is therefore defined by the angle $\theta_1-\phi$and that angle (and hence, the relative directions of $\overline{AB}$ and AA') is invariant as to the feature being extracted, regardless of the orientation of the pattern, its dimensional scale, or its position. The angle $\theta_2-\phi$ likewise defines the direction of line AA'' relative to $\overline{AB}$ and is invariant.

The orientations of the lines at point B are defined relatively to $\overline{BA}$, the direction of which is $\phi+\pi$measured relatively to the same reference direction or axis. Thus, proceeding in the same manner with respect to directions of lines BB', BB'', and BB''' relative to $\overline{BA}$, and using the same reference direction, three more invariant angles, $\theta_3-(\phi+\pi)$, $\theta_4-(\phi+\pi)$, and $\theta_8-(\phi+\pi)$, respectively, all measured in the same direction (or, the equivalent, invariant directions) are obtained. A total of five invariant angles have now been obtained, and, together with the orientation $\phi$ and the length of line $\overline{AB}$, form a basis for the extracted feature (alternatively termed derived feature or pattern feature). However, the number of invariant angles at the image points may be defined in many ways. For example, invariant directions may be taken singly, or in pairs, or in some other combination.

The number of features which may be extracted from an image is a function of the number of possible combinations of image points about which invariant measurements are chosen. If each feature consists of measurements about two image points, as in the example described above (i.e., measurements taken about images points A and B), and further, if the number of image points selected is $n$, then the number of features that may be extracted is $n(n-1)1/2$. This expression does not apply where more than two intersecting lines define a single image point.

Clearly, the consideration is also present that the smallest number of features that will serve to classify a pattern, within allowable tolerances, is much to be desired. Therefore, some restrictions may be placed upon the formation of features about image points, based upon practical considerations such as their separation. However, each extracted feature contributes individually to the classification of a particular pattern, and thus some redundancy is available, and desireable to maintain, to assure reliable classification despite the effects of partial obscuration or obliteration of the image.

While in the example of development or determination of a feature according to the preprocessing method of the present invention, as set forth above, reference has been made to selection of invariant measurements based on directions of lines emanating from each image point relative to the imaginary line of direction between a pair of image points in the feature, there is no intention to imply, nor is it implied, that this is the only type of invariant measurement that may be used to extract features of the image. Other examples of suitable invariant measurements are color or gray scale intensity of the image at predetermined image points provided that the sensor is properly standardized, as by periodic calibration, so that neither parameter is substantially affected by day-to-day drift of the characteristics of the sensor and provided that the field of view itself is not substantially affected by changes in level of light, for example, over a short interval of time. The significant teaching here is that one can choose the criteria, or conditions which determine the image point or points, on virtually an unlimited basis, although as previously observed, economy and optimum discrimination dictate selection on the basis of predominant characteristics of the pattern figure.

Returning for the moment to FIG. 1, prior to the performance of any recognition function the features extracted by the preprocessor 11 are supplied via switch 30, when moved from the position shown to engage contact 31, to a training and storage device 32. The desire is to obtain from known patterns a store of references against which unknown patterns may be compared to achieve recognition. Clearly, one can recognize only what he has somehow learned to recognize, although he may choose to accept something as equivalent or substantially similar to something he has previously learned to recognize on the basis that it has many features in common with it, albeit lacking a perfect match or perhaps even a reasonably corresponding match. In a machine learning system where automatic pattern recognition is to be achieved, the capacity to recognize any of a multiplicity of patterns depends upon the availability of sets of reference features against which the extracted features may be compared. The capability of recognizing patterns similar but not identical to those available for reference may be provided by relaxing the allowable tolerances within which a match may have been determined to occur.

In FIG. 1, the extracted features from each reference pattern are supplied by device 32 to a classifier 33 for comparison with unknown features. Once all of the reference patterns, or the sets of features extracted from those patterns, have been stored in device 32, i.e., inserted in its memory banks, cell, or matrices, switch 30 is shifted to the position shown in FIG. 1 to permit features extracted from an unknown pattern to be applied directly to the classifier for comparison with the stored reference features.

In the classification method, let it be assumed that features extracted from the image of FIG. 3 are to be compared with each set of stored reference features for each of the pattern classes. The method is performed in two steps; first, a comparison is made between the invariant unknown pattern measurements and the reference measurements, and second, the geometric relationships between image points, found to correspond as a result of the first comparison step, are compared as between unknown pattern and reference features. The correspondence of invariant measurements between features, and the degree of a geometric correspondence between their image points provides a measure of the similarity between unknown pattern and reference. The best classification of the pattern among several classes is derived from a set of such similarity measurements with respect to the several pattern class references.

Referring again, for example, to FIG. 3, the invariant angles are compared with angles from each of the stored invariant reference features, to establish equivalence within prescribed tolerances. As previously noted, the tolerances associated with this comparison may be derived from the process of training the system, using representative samples (features) of each of the pattern classes. Alternatively, practical fixed values for tolerances may be adequate. If the features associated with an unknown pattern in the image of FIG. 3 are found to match stored reference features of a particular pattern class within the allowed tolerances, with respect to all of the invariant measurements, then the second step of the classification method may be commenced. In essence, this procedure accomplishes two significant objectives. First, invariant information can be compared directly with the stored information for each reference class, and corresponding points identified, independently of relative orientation, position, and scale of image and reference data. Second, if no match exists between the invariant parameters of pattern and reference, no further comparison need be effected as to that reference, so that classification is performed rapidly and efficiently.

In those instances where the first step of the classification method establishes a match within allowable tolerances, the second step is commenced in which relative positions between points of correspondence are compared. In the latter comparison, the separation distance, or spacing, between pairs of corresponding image points in the pattern and reference determines their relative scale, while relative orientation of the lines of direction along which these distances are measured determines the relative angular orientation between pairs of corresponding points.

Consider now the unknown pattern features of FIG. 3 and the reference feature of FIG. 4. The invariant measurements consist of angles $\theta_1-\phi$, $\theta_2-\phi$, $\theta_3-(\phi+\pi)$, $\theta_4-(\phi+\pi)$, and $\theta_5-(\phi+\pi)$, for the unknown pattern feature, and of angles $\theta_1'-\phi'$, $\theta_2'-\phi'$, $\theta_3'-(\phi'+\pi)$, $\theta_4'-(\phi'+\pi)$, and $\theta_5'-(\phi'+\pi)$ in the reference feature. First this invariant information is compared to establish a satisfactory degree of match between the two features. If a match is obtained, the geometric relationships between corresponding points are compared, after normalization, to obtain information regarding relative scale and relative orientation. For example, the relative angle between lines $\overline{AB}$ and $\overline{DE}$ is $\phi-\phi'$, based on the assumption that the reference axes are similarly defined. Since the angle measurements are all relative to the respectively associated reference axis, it will, of course, be appreciated that the relationship between the reference axes for the known and unknown features need not be of any specific type, as long as it remains fixed for a given set of known and unknown features during the processing to derive measurements for subsequent comparison operations.

In addition, the length of line $\overline{AB}$ is normalized relative to line $\overline{DE}$ to obtain the relative scale $\overline{AB}/\overline{DE}$. The number of separate computations which are carried out will depend upon the number of features extracted from the image. The minimum number of features which must be extracted from the image to achieve adequate recognition performance will depend on the definition of the individual classes and the nature of the image background material.

The relative values of orientation and scale for sets of matching features are compared on a class-by-class basis in an effort to discover clusters of points in these two dimensions. The permissible size of a cluster is determined from the training process. The largest number of points occurring in a cluster in each class provides an indication of the probability that the particular pattern class is present.

Figure 5:
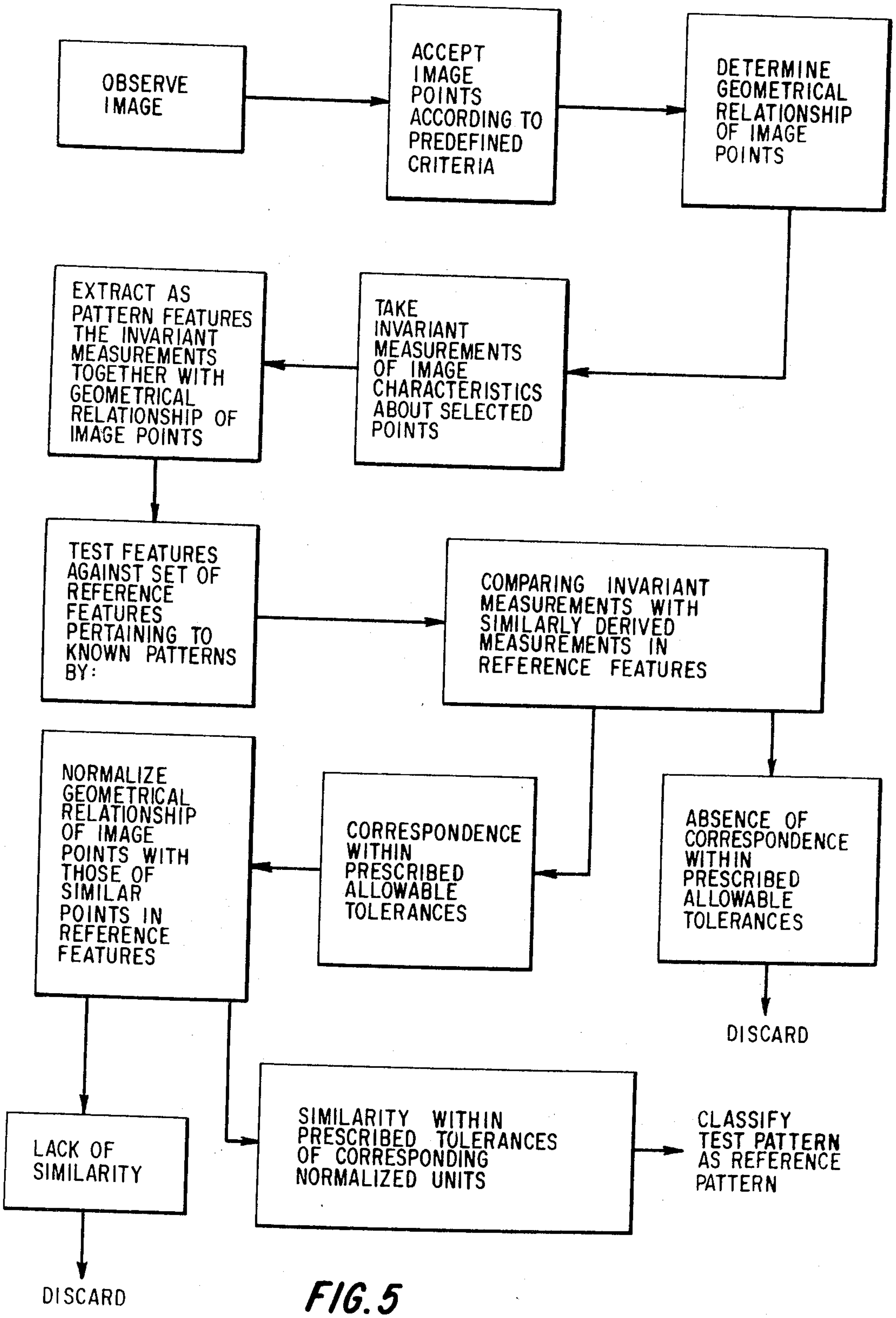
FIG. 5 is a block diagram of the flow of information and of processing, by which identification of the observed (test) pattern may be accomplished.

In summary, and with reference to the flow diagram of FIG. 5, the overall pattern recognition process involves observation of the image, followed by selection of image points which exhibit prescribed characteristics and determination of the geometrical relationship of the selected image points. It must be emphasized that the images presented for processing and pattern recognition may or may not contain patterns which the system has been trained to recognize. The preprocessing method and apparatus of the invention, however, serves to determine image points bearing substantial information to enable identification of patterns. This operation may be viewed as effecting, by the criteria established for the derivation and identification of such image points, a straight line approximation to the maximum gray scale gradient contour, for representing an object or pattern in the image. Measurements of values related to these image points permits the identification of features.

Invariant measurements are obtained from the prescribed characteristics, such as directions of lines emanating from the image points relative to the directions between the image points, color at each image point, maximum gradient of gray scale value relative to image point, and so forth. The measurements are invariant in the sense that they are independent of such factors as orientation and scale of the image, and position of the pattern within the image. The invariant measurements and the geometrical relationships between image points are extracted as pattern features for subsequent classification of the patterns within the image. This completes the preprocessing method of the present invention. It should be emphasized that the order or sequence in which these steps are followed is not critical.

The manner in which the information derived from the image by the preprocessing method is utilized to classify (i.e., "recognize") patterns within the image is the classification portion of the overall process, or simply, the classification method. The latter invention is claimed in the copending application of Tisdale and Pincoffs, entitled "Classification Method and Apparatus for Pattern Recognition Systems," application Ser. No. 867,247 of common filing date with this application, and assigned to the same assignee.

In the classification method, the features extracted from the image under observation are tested against a set of reference features pertaining to classes of known patterns, by first comparing the invariant measurements with similarly derived measurements of the reference features. If no correspondence is found between the extracted features and any of the reference features on this basis, the image under consideration is considered unclassifiable, and is discarded. If correspondence between invariant measurements of image features and the reference features does exist within allowable tolerances, then normalization is performed on the geometrical relationships of image points included in the features relative to the relationships of similarly positioned points in the reference features that have satisfied the comparison of the first test. If the patterns are identical, except for scale or orientation, the normalized distance between any pairs of points in the observed pattern will be the same as that between any other pair of points. Similarly, normalized angles between lines joining image points will be identical. That is to say, the normalization step serves to accent relative values in test pattern and reference pattern, so that if, for example, the distance between a pair of points in the test pattern is 1.62 times the distance between corresponding points in the reference pattern, that same factor should occur for all distance comparisons between corresponding points in the reference pattern. The second step in the classification method thus establishes correspondence between test pattern and a reference pattern, sufficient to permit final classification or to indicate the unclassifiable character of the test pattern.

The generation of a match indication does not require exact correspondence, since similarity within prescribed allowable tolerances determines the minimum degree of confidence with which it can be stated that the test pattern is in the same class as the reference pattern.

Figure 6:
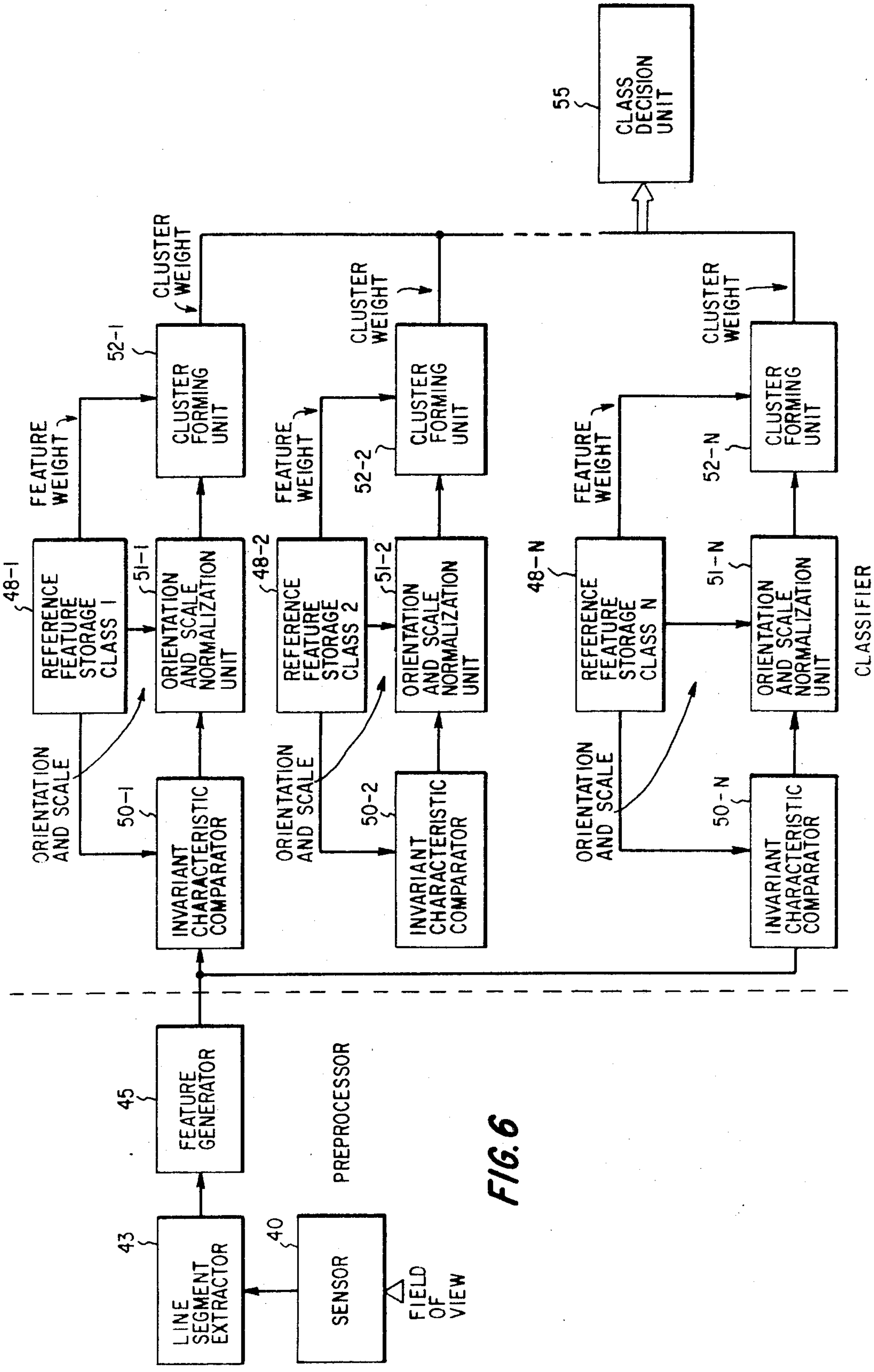
FIG. 6 is a more detailed block diagram of the pattern recognition system of the invention.

Referring now to FIG. 6, there is presented a more detailed diagram of exemplary apparatus suitable for performing pattern recognition, including preprocessing of an image and classifying of unknown patterns, is present within that image, in relation to sets of reference features for known patterns. Sensor 40 which may, for example, comprise an optical scanner, scans a scene of field of view (i.e., an image) and generates a digitized output, of predetermined resolution in the horizontal and vertical directions of scan, representative of observed characteristics of the image. As an example, sensor 40 may generate an output consisting of digitized gray scale intensities, or any other desired characteristic of the image, and such output may either be supplied directly to the preprocessor for development or establishment of features for use by the decision logic in the classifier, or be stored, as on magnetic tape, for preprocessing at a later time.

In any event, the digitized observed gray scale intensities of the image as derived by scanning sensor 40 are ultimately supplied to an extraction device 43, of a suitable type known heretofore to those skilled in the art, for extracting gray scale intensity gradients, including gradient magnitude and direction. These intensity gradients can serve to define line segments within the image by assembly into subsets of intensity gradients containing members or elements of related position and direction. Various parameters, such as end points, defining these subsets are then obtained. Curved lines are represented by a connected series of subsets.

The parameters defining the subsets, as derived by extractor 43, are then supplied to a feature generator 45. In essence, the feature generator is operative to form features from combinations of these parameters. To that end, generator 45 may be implemented by suitable programming of a general purpose computer or by a special purpose processor adapted or designed by one skilled in the art to perform the necessary steps of feature extraction in accordance with the invention as set forth above. In particular, the feature generator accepts image points contained in combinations of parameters defining subsets of gray scale intensity gradients, for example, and takes measurements with respect to image points of preferably greatest information content. Again, such image points may occur at the intersection of two lines, at a corner formed by a pair of lines, and so forth. After establishing the features, including properties which are invariant with respect to the various conditions of orientation, position, and scale of unknown patterns in the image, as well as information which is dependent upon those conditions and which, therefore, makes possible specific determination of size, shape, and position of figures, objects, characters, and/or other patterns that may be present, the preprocessing portion of the pattern recognition system has completed its function.

The output of feature generator 45 may be supplied directly, or after storage, to the classifier portion of the recognition system. Preferably this information is applied in parallel to a plurality of channels corresponding in number to the number of known pattern classes, 1, 2, 3,...,N, with whose reference features the extracted or formed features from the preprocessor are to be compared. Each channel includes a reference feature storage unit 48–1, ..., 48–N for the particular pattern class associated with that channel, which may be accessed to supply the stored reference features to the other components of the respective channel, these components including a comparator 50, a normalizing device 51 and a cluster forming unit 52. Each comparator 50 compares the invariant characteristics of the extracted features of the unknown pattern with the invariant characteristics of the reference features of the respective known pattern classes. The distance between each pair of image points, and the orientation of the imaginary line connecting each pair of image points, are then normalized with respect to the reference scale and orientation information. Finally, clusters are formed in accordance with the normalized outputs, as a representation of average position of orientation and scale based on the number of matches obtained between features of the image under consideration and reference features of the respective pattern class. The output of the cluster forming unit 52 is therefore a numerical representation of the overall degree of match between unknown or sample pattern and reference pattern, and further is an indication of the relative scale and relative orientation of sample and reference.

Cluster weight information from the several channels is supplied to a class decision unit 55 which is effective to determine the class to which the unknown pattern belongs as well as its orientation and scale relative to the reference pattern to which it most nearly corresponded, on the basis of a comparison of these cluster weights.

It should be emphasized that the image under observation may be compilated from a plurality of sources and may be of multispectral character. That is to say, one portion of the image may be derived from the output of an optical scanner, another portion of the image may be derived from the outputs of infrared sensors, still another portion of the image may be derived from the output of radar detection apparatus. The provision of such multispectral sensing does not affect the method as described above, nor does it affect the operation of apparatus for carrying out that method, also as described above. The same considerations apply regardless of the specific source or sources of the image and its spectral composition. Furthermore, the reference features with which image features are compared may also have been individually derived from sources of different spectral sensitivity, also without materially affecting the process or apparatus of the invention. In this manner, it is possible to form a greatly increased number of features from multispectral images including those formed from each image alone and, in addition, those formed between images. This increase in feature availability provides increased ability to perform recognition in the presence of background noise or partial obscuration.

These same advantages, and the inventive principles presented herein, apply to situations where two or more images under consideration pertain to the same field of view but have been derived from different vantage points relative to that field of view. For example, two or more aerial photographs may have been taken of the same area, but from different aerial locations relative to that area. Nevertheless, processing may be performed in the manner which has been described, to achieve pattern recognition between the photographs.

I claim as my invention:

1. The method of preprocessing information contained in an image to permit classification of an unknown pattern that may be present within said image relative to a set of reference pattern classes, which comprises:

accepting certain points within the image of substantial information-bearing character as image points for the extraction from the image of features of any patterns contained within the image.

taking measurements with respect to acceptable image points, said measurements being chosen to be invariant regardless of orientation, scale, and position of any pattern associated with each such image point, and extracting as features of said pattern the values of said invariant measurements together with sufficient data to establish the geometrical relationship between the accepted image points, for comparison with similarly determined features in each of the reference pattern classes.

2. The method of claim 1, wherein each said image point is accepted as representative of a predominant characteristic within said pattern.

3. The method of claim 1 wherein at least some of said measurements are taken to establish the orientation of lines emanating from said image points relative to the line of direction between a pair of said image points.

4. The method of claim 1 wherein at least some of said measurements are taken to ascertain the color or intensity of color at said image points.

5. The method of claim 1 wherein at least some of said measurements are taken to establish the maximum gradient of gray scale value relative to some of said image points.

6. The method of claim 1 wherein measurements for each feature are taken about only two image points, and the number of features to be extracted is $n(n-1)/2$, where $n$ is the totality of points available for feature formation.

7. The method of claim 2 wherein said measurements are taken to establish the orientation of lines emanating from at least some of said image points relative to the line of direction between a pair of said image points, said lines being selected to correspond with actual lines or gradient contours in said pattern.

8. The method of claim 1 wherein the information is contained in two or more images derived from sensing devices of different spectral response.

9. The method of claim 1 wherein two or more images are under consideration which pertain to the same field of view but which have been derived from different vantage points relative to that field of view.

10. A process for extracting features contained within a two-dimensional image for subsequent recognition of an unknown pattern that may be present within the image as one of a set of known patterns, said process including performing measurements of observed phenomena about two or more selected points in the image, which measurements are independent of scale, orientation, and position of any pattern with which they may be associated, detecting the relative positions of said selected points in the image, and utilizing the information obtained from the invariant measurements, and data indicative of the relative positions of the points about which said measurements are taken, as features of unknown patterns that may be present in the image, from which pattern recognition may be achieved.

11. The process according to claim 10 wherein said measurements are of color.

12. The process according to claim 10 wherein said measurements are of intensity of gray scale value.

13. The process according to claim 10 wherein said measurements are of maximum gradient of gray scale intensity relative to said points.

14. The process according to claim 10 wherein said measurements are of orientations of lines emanating from some of said points relative to a line joining a pair of said points.

15. The process according to claim 14 wherein said lines emanating from selected points coincide with lines in the image.

16. In a pattern recognition process, the steps of:

scanning a two-dimensional image to extract features of unknown patterns that may be present within the image suitable for classifying each such pattern, detecting in the scanned image selected measurable characteristics that are invariant regardless of scale, orientation, or position of any unknown patterns with which those characteristics may be associated within the image.

measuring at least one of said characteristics at a plurality of points in said image, and extracting the measured data along with data indicative of geometrical relationships of the points at which the measurements are taken to determine the relative positions of the points, as features for classifying the unknown patterns, if present.

17. In a pattern recognition process, the steps of:

performing measurements about points of high information content in an image, which measurements are invariant with respect to orientation, scale, and position within the image of a pattern including said points, determining the distance between pairs of said points, and the orientation of a straight line containing a pair of the points relative to a reference axis, and supplying information representative of the invariant measured values and of the distance between pairs of points and the orientation of said line by which to detect the known pattern class in which lies an unknown pattern associated with at least some of said measured values and points.

18. Apparatus for extracting information from a field of view preliminarily to classification of any unknown pattern that may be present within said field of view, comprising:

means for detecting information characteristic of and peculiar to said field of view, means responsive to the detected information for deriving therefrom a smaller amount of information of substantial content representative of prominent characteristics within said field of view, in contrast to indistinct background of low information content, means responsive to said information of substantial content for obtaining measurements with respect to points of prominence chosen therefrom, said measurements being invariant regardless of orientation, scale, and position of an unknown pattern that may be present within said field of view and associated with said points, and means responsive to said measurements for determining the relative positions of pairs of said points for subsequent use with said invariant measurements to classify the associated unknown patterns, if present.

19. Apparatus as recited in claim 18 wherein said detecting means comprises at least two distinct detecting means having different spectral responses.

20. Apparatus as recited in claim 18 wherein said detecting means comprises at least two distinct detecting means exposed to the same field of view but having different vantage points relative to the field of view.

* * * * *